US009994245B2

(12) United States Patent
Hendrick et al.

(10) Patent No.: US 9,994,245 B2
(45) Date of Patent: Jun. 12, 2018

(54) METHOD AND APPARATUS FOR HOLDING CONTAINERS OPEN

(71) Applicant: Wal-Mart Stores, Inc., Bentonville, AR (US)

(72) Inventors: Christopher J. Hendrick, Rogers, AR (US); Stephen Caution, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days. days.

(21) Appl. No.: 15/603,981

(22) Filed: May 24, 2017

(65) Prior Publication Data

US 2017/0253260 A1    Sep. 7, 2017

Related U.S. Application Data

(63) Continuation of application No. 15/134,593, filed on Apr. 21, 2016, now Pat. No. 9,694,840.

(60) Provisional application No. 62/152,140, filed on Apr. 24, 2015.

(51) Int. Cl.
*B62B 3/14*            (2006.01)
(52) U.S. Cl.
CPC .................. *B62B 3/1464* (2013.01)
(58) Field of Classification Search
CPC .................. B62B 5/00; B62B 3/1464
See application file for complete search history.

(56) References Cited

U.S. PATENT DOCUMENTS

| 1,679,450 A | 8/1928 | Thompson |
| 4,560,096 A | 12/1985 | Lucas |
| 4,578,388 A | 3/1986 | Pope |

(Continued)

FOREIGN PATENT DOCUMENTS

| EP | 2578468 | 4/2013 |
| WO | 2013093384 | 6/2013 |

OTHER PUBLICATIONS

UKIPO; App. No. GB1606999.9; Combined Search and Examination Report dated Aug. 26, 2016.

(Continued)

*Primary Examiner* — John D Walters
*Assistant Examiner* — James J Triggs
(74) *Attorney, Agent, or Firm* — Fitch, Even, Tabin & Flannery

(57) ABSTRACT

In some embodiments, systems, apparatuses and methods are provided herein that are useful for holding containers open. For example, in some forms a cart accessory and cart are disclosed herein with an apparatus for holding open a receptacle or container. In one form, the apparatus is an accessory including an elongated body having a cart attachment mechanism for securing the cart accessory to at least a portion of a cart, a receptacle securing mechanism connected to the elongated body via a tether, the receptacle securing mechanism being movable between a retracted position wherein the securing mechanism is positioned proximate the elongated body and an extended position wherein the securing mechanism is spaced apart from the elongated body closer to at least a portion of a receptacle to assist in holding open the receptacle when connected thereto. In another form a cart is disclosed having such a container holding apparatus.

5 Claims, 5 Drawing Sheets

(56) References Cited

U.S. PATENT DOCUMENTS

| | | | |
|---|---|---|---|
| 4,974,799 A * | 12/1990 | Palmer | B62B 3/106 |
| | | | 224/411 |
| 5,361,956 A | 11/1994 | Recanati | |
| 5,531,366 A | 7/1996 | Strom | |
| 5,711,499 A | 1/1998 | Sectish | |
| 6,152,408 A | 11/2000 | O'Grady | |
| 6,726,156 B1 | 4/2004 | Scola | |
| 7,213,821 B1 | 5/2007 | Johnson | |
| 7,575,161 B2 | 8/2009 | Nguyen | |
| 7,887,068 B2 | 2/2011 | Ferguson | |
| 9,694,840 B2 | 7/2017 | Hendrick | |
| 2005/0205632 A1 | 9/2005 | Ristau | |
| 2006/0181062 A1 | 8/2006 | Robinson | |
| 2009/0101253 A1 | 4/2009 | Kinskey | |
| 2012/0169020 A1 | 7/2012 | Farrell | |

OTHER PUBLICATIONS

U.S. Appl. No. 15/134,593; Corrected Notice of Allowability dated Apr. 4, 2017.
U.S. Appl. No. 15/134,593; Non-Final Office Action dated Sep. 21, 2016.
U.S. Appl. No. 15/134,593; Notice of Allowance dated Feb. 24, 2017.

\* cited by examiner

METHOD AND APPARATUS FOR HOLDING CONTAINERS OPEN

CROSS-REFERENCE TO RELATED APPLICATION

This application is a continuation of U.S. application Ser. No. 15/134,593, filed Apr. 21, 2016, which claims the benefit of U.S. Provisional Application No. 62/152,140, filed Apr. 24, 2015, which are incorporated herein by reference in their entireties.

TECHNICAL FIELD

This invention relates generally to operational equipment for retail stores, and more specifically to apparatus for holding containers open such as bags within a cart and methods relating to same.

BACKGROUND

Retail stores are continually challenged to make the shopping experience easier and more enjoyable for their customers, to keep up with the ever-changing practices or habits of their customers and to abide the changing and non-uniform regulations imposed by local municipalities, states and the federal government, as well as those of foreign jurisdictions for international retailers. One example of this is the current movement toward use of reusable shopping bags for retail store purchases. Some jurisdictions have gone so far as to ban single-use plastic bags from retailers such as big box stores, groceries and the like, thus, essentially mandating use of reusable shopping bags.

Another example of this relates to more technologically savvy customers who utilize handheld electronic devices during their shopping. Such use may simply be the result of customers multitasking, while in other instances it may be directly related to the shopping experience (e.g., use of mobile devices to do competitive price checks, use of mobile devices to scan product as it is placed in the shopping cart and thereby expedite checkout, etc.).

One common problem in both of these exemplary situations is the difficulty consumers have in placing products directly into shopping bags while using a vehicle, such as a shopping cart, to roam the retail store. Various attempts have been made to address this problem, but these attempts typically create more hassles or problems than the general consumer/customer wants to face when conducting their shopping. For example, some require the use of special carts that must be brought to and from the retail store by the consumer. Others require the use of special bags even more unique than the typical reusable shopping bag that may or may not work depending on the type of carts used at the retail store.

Accordingly, it has been determined that a need exists for an improved apparatus for holding containers, such as shopping bags, open within a cart and for improved methods relating to same.

BRIEF DESCRIPTION OF THE DRAWINGS

Disclosed herein are embodiments of systems, apparatuses and methods for holding containers open. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for holding containers open. As mentioned above, retail stores are constantly challenged to make the shopping experience easier and more enjoyable for their customers and to keep up with the practices or habits of their customers and regulations imposed by jurisdictional authorities. Recent examples of this relate to the increased use of reusable shopping bags instead of single use bags to provide a more "green" or environmentally friendly retail experience and/or the desire by some consumers for a more technologically advanced retail experience. With respect to the former, it is desired to make it easier for consumers to utilize reusable shopping bags, and with respect to the latter, it is desired to make it easier for consumers to utilize technology throughout their shopping experience (e.g., use of smart phones to price check, use of hand held electronic devices such as Wal-Mart's Scan & Go™ devices to expedite bagging and/or checkout, etc.) while using such reusable bags. It is also desired to be able to accomplish these goals utilizing existing retail store resources as much as possible and without making the shopping experience more complicated or less enjoyable to the consumer.

Figure 1A:
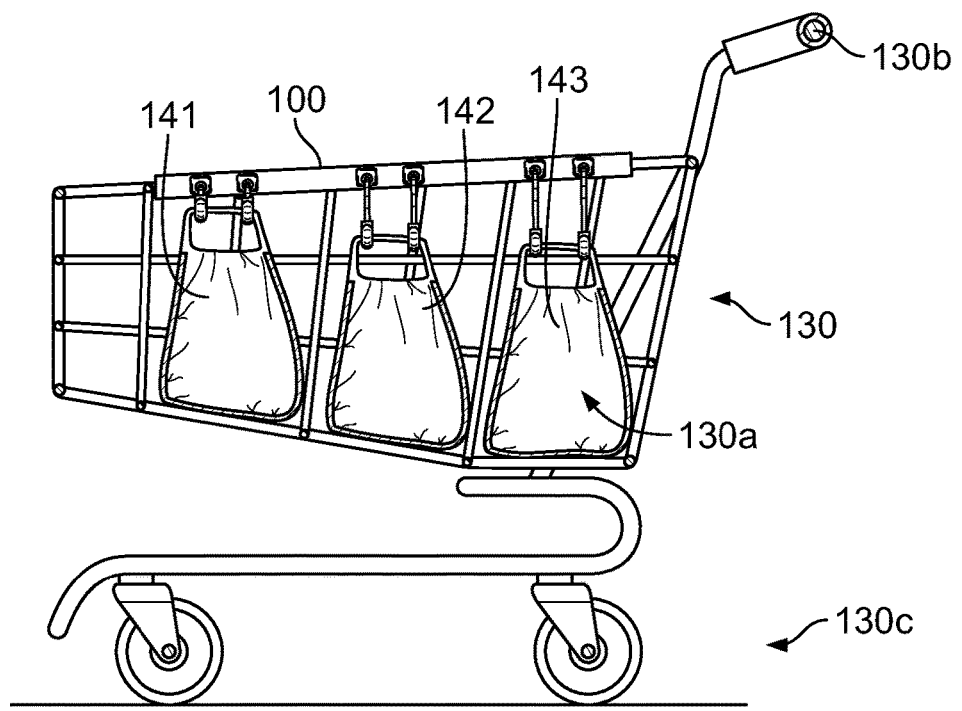
FIGS. 1A and 1B are cross-sectional and top plan views, respectively, of a shopping cart having an apparatus for holding open shopping bags in accordance with some embodiments, the cross-section of FIG. 1A being taken along line 1A-1A in FIG. 1B.
Figure 1B:
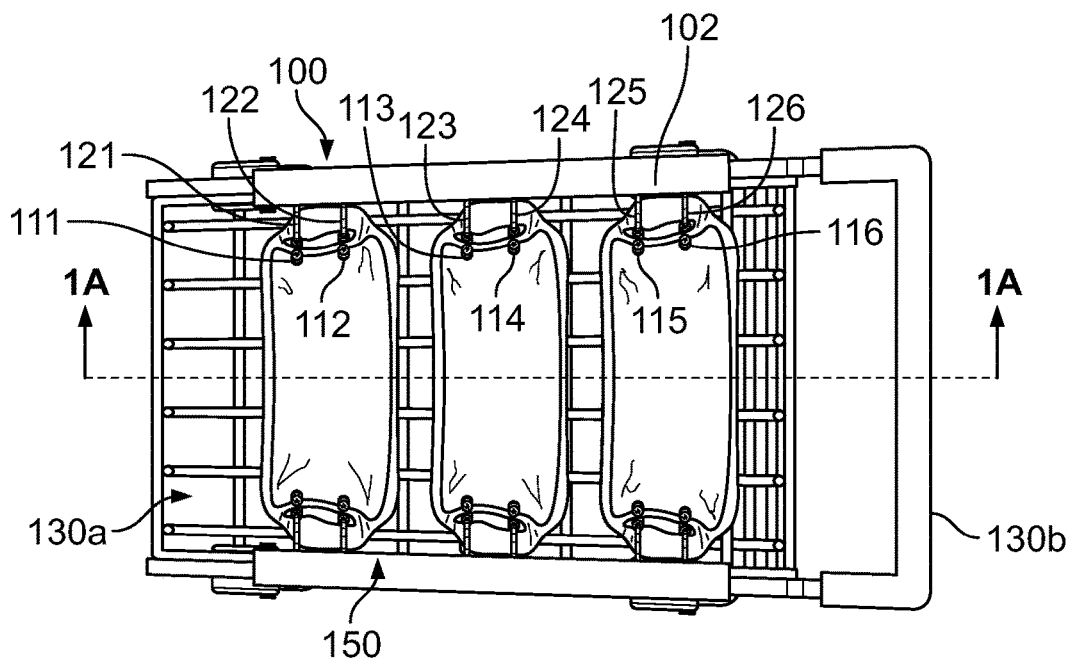

An exemplary embodiment of a solution to these issues is illustrated in FIGS. 1A and 1B. In these figures an apparatus 100 is illustrated for holding containers, such as bags 141, 142 and 143, open within a vehicle, such as shopping cart 130, so that the consumer can easily and immediately bag the items they intend to purchase while they shop without the need to hold the bags open, thereby freeing up their hands for operation of the cart and/or additional items such as smart phones, hand held electronic devices, etc. In the form illustrated, the bag holding apparatus 100 is illustrated as an accessory attachable to a conventional shopping cart 130 and includes a second such apparatus 150 for position on an opposite side of the cart 130. While two bag holding apparatus are shown (i.e., 100 and 150), only one will be described in detail because the items are similar in operation and, thus, describing both is redundant and unnecessary.

In the form illustrated (and as will be discussed further below), the bag holding apparatus 100 is illustrated as an attachable accessory to the conventional cart 130. However, it should be understood that in alternate embodiments the apparatus 100 could be formed integral to the cart 130 and, thus, in some forms the invention may include an entire cart and not just an accessory for same, while in others it is simply a device for attaching to a cart or other vehicle.

In FIGS. 1A and 1B, the cart 130 defines a cavity, such as basket 130a and includes a handle 130b and mobilizer such as wheels or wheel assembly 130c. The body of the cart is preferably made of plastic or metal and uses a meshed or interconnecting pattern with openings or spaces therein to reduce the amount of material used to make the cart 130 and/or to make the cart 130 lighter. In this example, the bag holding apparatus accessories or attachments 100, 150 are connected to the top of opposing side walls (e.g., rims or rails) of cart 130 and are orientated so that they run a majority of the length of the basket or cavity 130a of cart 130 so that multiple bags can be retained open as desired with each apparatus 100, 150.

In a preferred form, the apparatus 100 will also have a low profile design so as not to interfere with the carts ability to nest or dock with other carts when being stored or transported either manually or using a cart management aid such as an automated cart pusher, puller or retriever (e.g., Gatekeeper Systems' CartManager™). For example, the apparatus 100 is of a small enough profile to fit within the receiving opening of another cart when two carts are joined to each other for storage or transport. In addition, the apparatus 100 is fastened to its respective cart sufficiently to withstand the removal force exerted on the cart 130 when it is removed from the receiving opening of another cart (e.g., de-nested, de-coupled, separated, etc.) so that this action does not dislodge the apparatus 100 from its respective cart 130.

In the form shown, the accessory device 100 includes an elongated body 102 having a respective cart securing or attachment mechanism 104 for securing the cart accessory 100 to at least a portion of a cart 130, and a plurality of receptacle securing mechanisms or connectors 111, 112, 113, 114, 115 and 116 connected to the elongated body 102 via corresponding tethers 121, 122, 123, 124, 125 and 126. In a preferred form, the receptacle securing mechanisms 111-116 are hooks, clasps, clamps or the like, and the tethers 121-126 are expandable or elastic making the receptacle securing mechanisms 111-116 movable between a first, retracted position wherein the securing mechanisms 111-116 are positioned proximate their respective elongated body 102 and a second, extended position wherein the securing mechanisms 111-116 are spaced apart from their respective elongated body 102 closer to at least a portion of a receptacle (e.g., 141-143) to assist in holding open the receptacle when connected thereto. The elastic or expandable nature of the tethers 121-126 also make the apparatus 100 usable with many different types of bags, e.g., bags of different make, size (e.g., height, dimension, diameter, volume, etc.), shape, etc. Thus, the apparatuses 100, 150 are bag agnostic and give the consumer the freedom to continue using bags of their choice or liking rather than requiring specific bags for use with this invention.

While the embodiment illustrated in FIGS. 1A-1B shows two apparatus 100, 150, each having three sets of bag securing mechanisms and corresponding tethers, 101l-q, it should be understood that in alternate embodiments more or fewer apparatus may be provided, the apparatus may be of different lengths and/or each may have one or more bag securing mechanisms and corresponding tethers. For example, in some instances, it may be desired to have smaller bag securing apparatus that cover or connect to a smaller portion of the basket 130 with each apparatus only having one, two or a few bag securing mechanisms and corresponding tethers. Thus, with such a configuration many of these apparatus may be connected to a single cart 130, if desired. In other forms, apparatus with more bag securing mechanisms and corresponding tethers may be desired. Similarly, although the illustrated apparatus are shown orientated on cart side walls running parallel to a longitudinal axis of the cart (e.g., the axis the cross section of FIG. 1A is taken along), it should be understood that in alternate embodiments apparatus may be provided on one or more of the other side walls of the cart running perpendicular to the longitudinal axis of the cart. For example, one bag holding apparatus may be positioned on the cart wall nearest and parallel to the handle 130b, while another is positioned on the parallel cart wall farthest from the handle 130b. Alternatively bag holding apparatus may be positioned on all four cart walls if desired.

An alternate embodiment of a bag holder apparatus in accordance with the invention is illustrated in FIGS. 2A-2D. For convenience, items in this embodiment that are similar to those discussed previously with respect to the embodiment of FIGS. 1A-1B will use the same latter two digit reference numeral but with the prefix 2 instead of 1. Thus, in the embodiment of FIGS. 2A-2D, the bag holder apparatus is referred to generally by reference numeral 200 and includes an elongated body 202 with a cart securing mechanism 204. Unlike the prior embodiment, however, the embodiment of FIGS. 2A-2D includes more bag securing mechanisms 211-218 and associated tethers 221-228 and has mating recesses 202a-h within which the bag securing mechanisms 211-218 may be stored or disposed.

In the form illustrated, the cart attachment or securing mechanism of apparatus 200 comprises an elongated channel 204 defined by body 202 for receiving at least a portion of the cart, and the receptacle securing mechanism comprises a plurality of receptacle securing mechanisms 211-218, with the elongated body 202 further defining a plurality of recesses 202a-h for receiving respective receptacle securing mechanisms 211-218 when in the first or retracted position. Preferably, the receptacle securing mechanisms are hooks or clasps and the plurality of recesses are sockets corresponding in shape to the hooks or clasps so that when the hooks or clasps are moved to the retracted position the hooks or clasps are secured within the sockets to hinder inadvertent removal of the hooks or clasps from the sockets. Thus, with such a configuration, the apparatus 200 will not interfere with a consumer's use of a conventional cart 230 if the consumer chooses not to use the apparatus 200. In alternate forms, other types of fastening or securing mechanisms may be used to attach the tethers to the receptacle that is to be opened via the apparatus. For example, in some forms other types of fasteners, such as clips, buttons, hook-and-loop mating structures, magnets, etc. may be used to releasably secure the receptacle securing mechanisms to the receptacle or bag intended to be kept open.

As mentioned above, in the embodiment illustrated the tether comprises a plurality of tethers 221-228 (of which only 228 is visible in FIGS. 2A-2D because of it being in the extended position) each having a respective hook or clasp from the plurality of receptacle securing mechanisms 211-218. Preferably the tethers 221-228 will be of elastic or expandable material that is resilient in nature (e.g., bungee or shock cord, etc.) and the hooks or clasps 211-218 will be normally biased in the first or retracted position due to the resilient nature of the elastic or expandable material of tethers 221-228. While recesses are shown, it should also be understood that in alternate embodiments recesses may not be used or, alternatively, recesses of different sizes or shapes may be used that may or may not correspond in shape to the receptacle securing mechanisms 211-218. For example, in one form a common recess may be provided for multiple receptacle securing mechanisms 211-218 (e.g., a notched or depressed area located within the elongated body 202 for receiving multiple hooks or clasps).

In addition, it should be understood that in alternate forms the receptacle securing mechanisms may releasably dock or mate with the elongated body 202 via other forms of mating, such as hook-and-loop fastener, magnetism, etc. For example, the receptacle securing mechanism could be equipped with a magnet that attracts the receptacle securing mechanism to the elongated body 202 or portion of cart proximate the elongated body 202 to store the receptacle securing mechanism in the retracted position when not in use. The elongated body 202 could even include a structure to aid in the making of this coupling, such as having another magnet arranged or oriented with the opposite pole facing the receptacle securing mechanism to strengthen the magnetic attraction between the receptacle securing mechanism and elongated body 202. In another form, either the receptacle securing mechanism or the elongated body could be provided with hooks for mating with corresponding loop fasteners on the other of the receptacle securing mechanism or elongated body to couple these features in conventional hook-and-loop fashion.

Figure 2A:
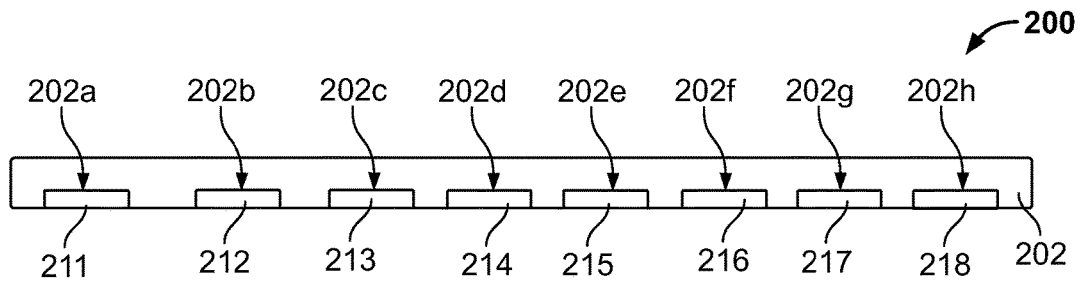
FIGS. 2A, 2B and 2C are top plan, front elevation and right side elevation views, respectively, of the apparatus for holding open shopping bags of FIG. 1, with FIG. 2D being another right side elevation view of same but with a bag securing mechanism extended out from the apparatus illustrating the tether connecting the securing mechanism to the apparatus.
Figure 2B:
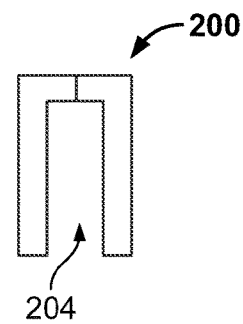
Figure 2C:
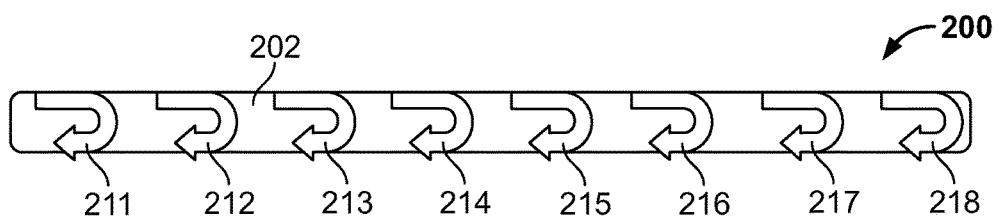
Figure 2D:
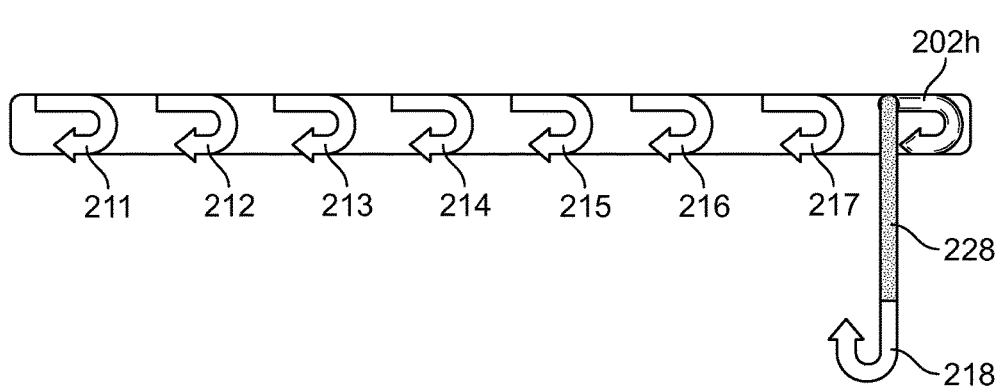

In FIGS. 2A-2D, the elongated body 202 forms a rail and the elongated channel of the cart attachment mechanism 204 forms a friction or snap-fit grooved structure into which at least a portion of the cart 230 is disposed. The friction or snap-fit grooved structure 204 has a generally inverted U-shape or downward opening U- or C-shape cross section. In some forms, the distal ends of the grooved structure 204 will flex between a normally biased first/secured position wherein the grooved structure may be secured to or closed around an item to which it is connected and a second/extended or released position wherein the distal ends of the grooved structure are spaced sufficiently apart from one another to allow access to or from an interior of the grooved structure. Although the end view of FIG. 2B illustrates the elongated body 202 as having a squared off design, it should be understood that in alternate embodiments this design could be rounded or beveled so as to have a softer curved shape (e.g., such as a downward opening C-shape) if desired.

Figure 3A:
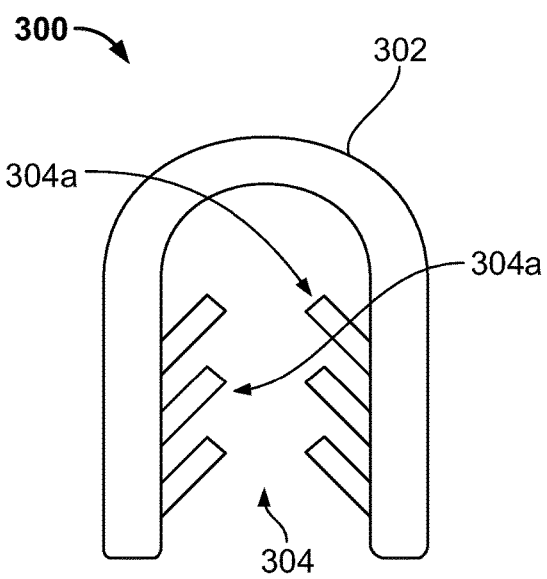
FIGS. 3A and 3B are front elevation views of an alternate apparatus for holding open shopping bags in accordance with several embodiments, the apparatus having an optional gripping structure, with FIG. 3B illustrating the apparatus installed on a portion of a shopping cart.
Figure 3B:
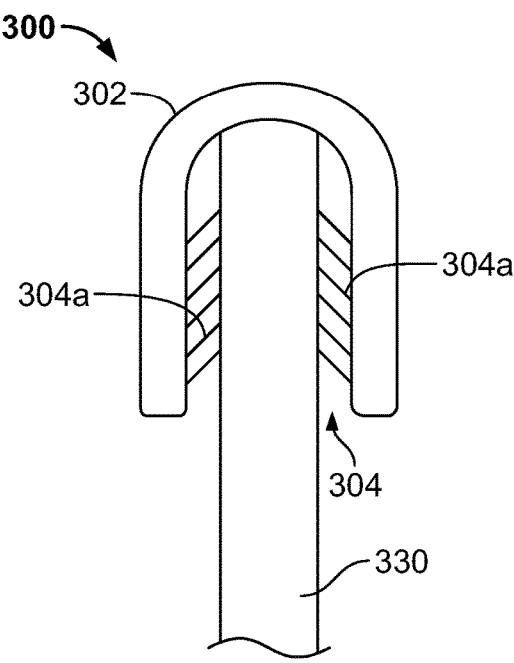

In alternate embodiments, the cart securing mechanism 204 may take a variety of different shapes, sizes or configurations/constructions. For example, in some forms, the cart attachment mechanism may include additional features to help secure the accessory to the cart as is illustrated in the alternate embodiment of FIGS. 3A-3B. In keeping with the above practice, items of this embodiment that are similar to those previously discussed will use the same latter two-digit reference numeral, but have a prefix 3 instead of 1 or 2 to indicate it is a third embodiment. Thus, in this embodiment the bag holding apparatus is referenced generally by reference numeral 300 and includes an elongated body 302 having a cart securing mechanism 304 made-up of an elongated channel having an inverted U-shaped cross-section with a downward facing opening. The cart securing mechanism 304 further includes protrusions, such as angled teeth or barbs 304a, extending from an inner surface of the elongated body 302 which help frictionally fit the apparatus 300 to the cart 130, such as to the upper rail or sidewall portion illustrated in FIG. 3B. In this form, the teeth 304a are angled to allow the apparatus 300 to easily be connected to the cart 330, but the angle 304a is such that it hinders removal of the apparatus 300 from the cart 330 once installed thereon. Although the teeth are illustrated as having a uniform thickness, it should be understood that the teeth could taper toward their distal end or be barbed at their distal end in order to assist in securing the apparatus 300 to the cart 330 (e.g., in order to help the teeth dig into the cart surface). The teeth could also be made of flexible material, such as elastomeric or rubber material, in order to assist in frictionally fitting the elongated body 302 to the cart 330 while still allowing it to be removed more easily and not damaging or marring the cart by digging into the material of same. A flexible protrusion configuration may also be used to assist in connecting the apparatus 300 to carts of different thickness.

Figure 4A:
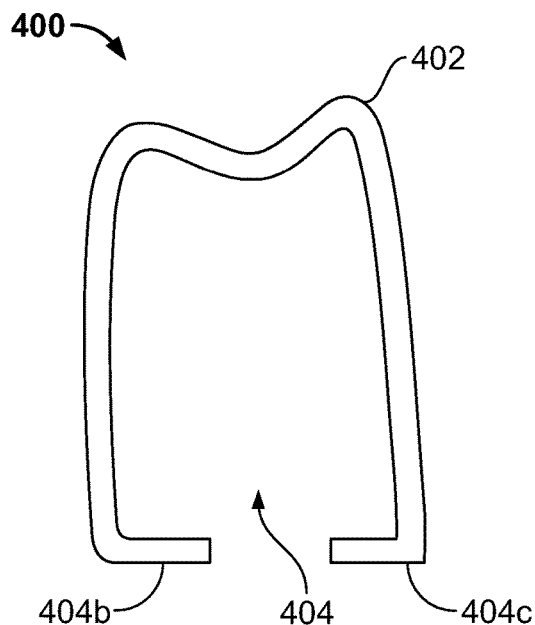
FIGS. 4A and 4B are front elevation views of an alternate apparatus for holding open shopping bags in accordance with some embodiments, the apparatus having an optional clamp configuration, with FIG. 4B illustrating the apparatus installed on a portion of a shopping cart.
Figure 4B:
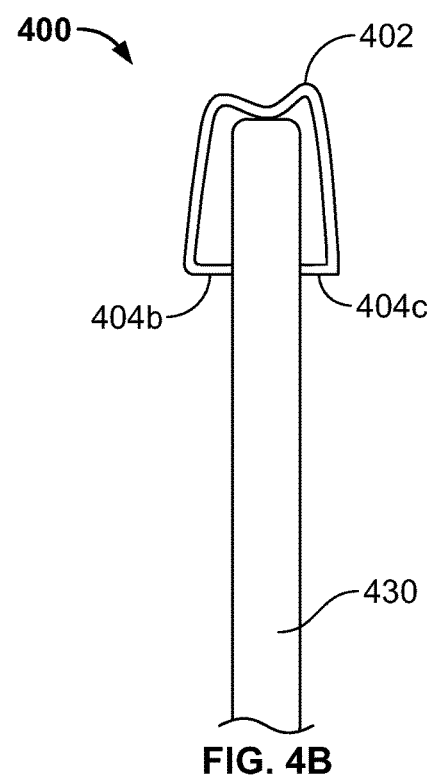

In other embodiments, the cart attachment mechanism may be designed with a greater capacity for adjusting to carts of different size or shape. Alternate embodiments with such configuration are illustrated in FIGS. 4A-4B, 5A-5B and 6A-6B. In keeping with the above practices items that are similar to those discussed above will be referenced using the same latter two-digit reference number but having prefix 4 for the fourth embodiment of FIGS. 4A-4B, prefix 5 for the fifth embodiment of FIGS. 5A-5B and prefix 6 for the sixth embodiment of FIGS. 6A-6B. In FIGS. 4A-4B, an alternate bag holding apparatus 400 is illustrated having an elongated body 402 with a clip or clamp type cart securing mechanism 404. In this form, the cart securing mechanism 404 has a spring type flexibility that allows the distal ends of the cart securing mechanism 404b, 404c to move (e.g., flex, spread, etc.) in order to accommodate carts of different size or thickness. The distal ends 404b, 404c also have a protrusion such as a tooth or ridge to help connect the apparatus 400 to cart 430. The movement of the apparatus 400 allows the distal ends 404b, 404c to move from a first/normally biased position wherein the ends 404b, 404c are positioned near or proximate one another to a second expanded position wherein the ends 404b, 404c are spaced apart from one another to fit a portion of cart 430 therebetween and then clamp onto the portion of cart 430 located between the ends 404*b*, 404*c*.

Figure 5A:
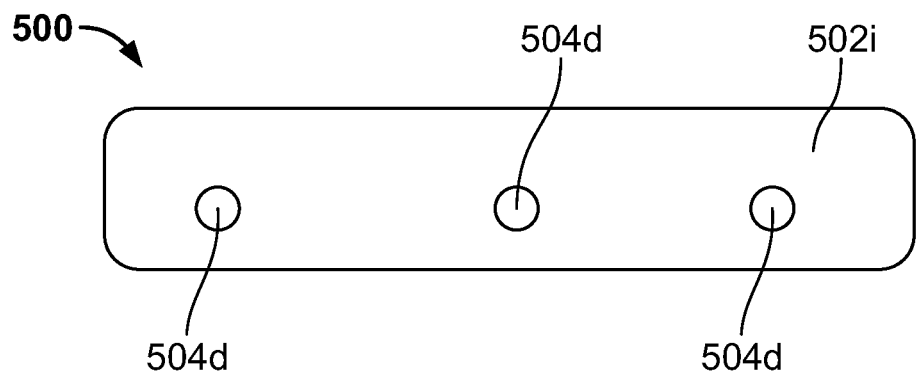
FIGS. 5A and 5B are left side elevation and front elevation views, respectively, of an alternate apparatus for holding open shopping bags in accordance with several embodiments, the apparatus having an optional fastener configuration, with FIG. 5B illustrating the apparatus installed on a portion of a shopping cart.
Figure 5B:
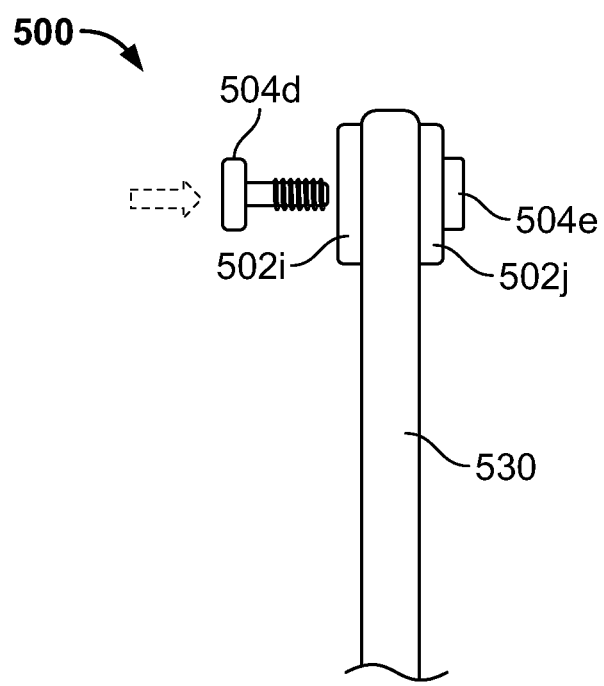

Even greater capacity for adjusting to carts of different size or shape is possible with the alternate embodiment of FIGS. 5A-5B. In this form, the apparatus 500 is secured to the cart 530 using a fastener type configuration. More particularly, the apparatus 500 has a body made-up of first and second members 502*i*, 502*j* respectively, instead of having a uniform body with an inverted U- or downward opening C-shape. In this embodiment, one of the first and second members 502*i*, 502*j* define recesses for receiving the bag securing mechanisms and the two members 502*i*, 502*j* are secured to the cart 530 via a fastener, such as a bolt, rivet, screw, etc. In the form shown, the cart securing mechanism 504 comprises a bolt 504*d* and nut 504*e* which are tightened to sandwich a portion of the cart (e.g., any cart) between the first and second members 502*i*, 502*j*, or at least the head of bolt 504*d* and inner surface of nut 504*e*. The bolt or fastener is movable between a first unlocked position wherein the cart accessory may be connected to or removed from at least a portion of the cart, and a second locked position wherein at least one fastener and cart attachment mechanism secure the cart accessory to at least a portion of the cart 530. Bolts of different length may be used to adjust to carts of varying size. It should be understood that in alternate versions, the body of apparatus 500 may only include one body member (e.g., 502*i* or 502*j*) instead of two and the fastener may include additional hardware such as washers if desired. It should also be understood that a uniform body construction could be used such as an inverted U-shaped structure or downward opening C-shaped structure if desired, with the legs of such a structure being clamped together via a fastener as discussed above.

Figure 6A:
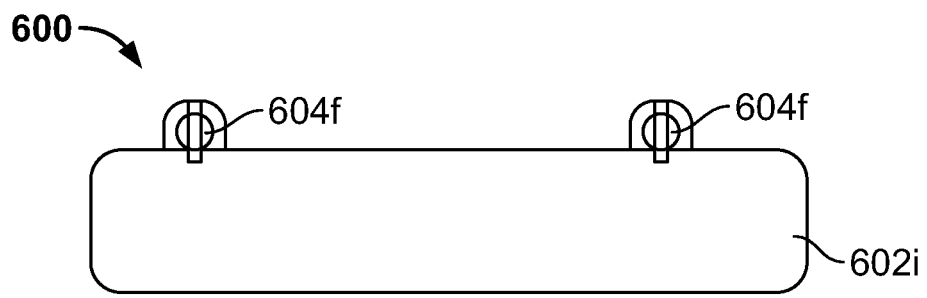
FIGS. 6A and 6B are left side elevation and front elevation views, respectively, of an alternate apparatus for holding open shopping bags in accordance with some embodiments, the apparatus having an optional vise-type locking configuration, with FIG. 6B illustrating the apparatus installed on a portion of a shopping cart.
Figure 6B:
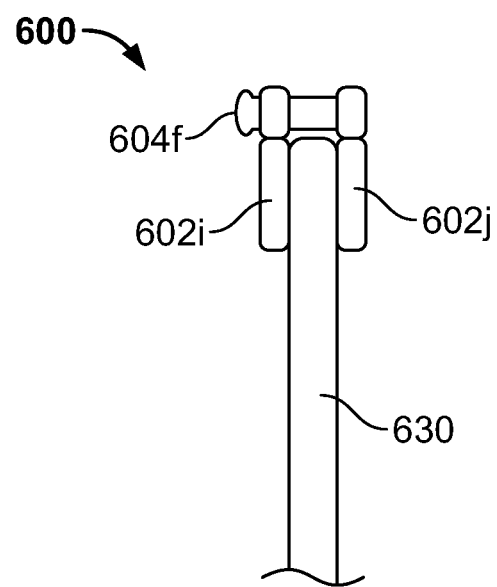

Like the embodiment of FIGS. 5A-5B, the embodiment of FIGS. 6A-6B allows for greater capacity for fitting carts of different size. In this embodiment, the apparatus 600 is provided with a clamp or vise type cart securing mechanism configuration. More particularly, the body 602 and cart securing mechanism 604 are integrated so that the first and second body members 602*i*, 602*j* are utilized like jaws for the cart securing mechanism 604. An actuator 604*f* is utilized to move the jaws 602*i*, 602*j* toward or away from one another to clamp or sandwich the cart 630 between the jaws of the cart securing mechanism 604. In the form illustrated, actuator 604*f* is a pin that is used to clamp and release the jaws of cart securing mechanism 604 against whatever cart the apparatus 600 is intended to be secured to for purposes of assisting in holding a container open within cart 630. At least one of the first and second jaws 602*i*, 602*j* is movable with respect to the other of said first and second jaws 602*i*, 602*j* in order to adjust to fit carts of different shape or size. In alternate forms, other types of actuators may be used including those that provide more leverage for clamping the apparatus 600 to cart 630, if desired (e.g., cammed levers, T-bolts, etc.).

As mentioned above, the apparatus for holding open a container or receptacle may comprise a plurality of such accessories. For example, a first attachable accessory with a first elongated body and first cart attachment mechanism may be provided along with a second attachable accessory having a second elongated body with a second cart attachment mechanism for securing the second cart accessory to at least a second portion of the cart. The second receptacle securing mechanism may be connected to the second elongated body via a second tether and movable between the retracted position wherein the second securing mechanism is positioned proximate the second elongated body and the extended position wherein the second securing mechanism is spaced apart from the second elongated body closer to at least a portion of the receptacle to assist in holding open the receptacle when connected thereto. The cart will preferably have at least two side walls defining a cavity for receiving and transporting items, with the first attachable accessory connected to at least a first portion of the first side wall and the second attachable accessory connected to at least a portion of the second side wall so that the respective receptacle securing mechanisms extend toward one another and toward or into the cavity when in the extended position to assist in holding open the receptacle when connected thereto. In one form the first and second side walls are on opposite sides of the cavity and the cart further comprises a bottom wall extending between the first and second side walls forming a floor or base of the cavity, the first and second attachable accessories are positioned opposite one another so that the respective receptacle securing mechanisms extend toward one another and into the cavity when in the extended position. As also mentioned above, in a preferred form the tethers will be of sufficient length or elasticity or of sufficient expandable material to allow the receptacle to which they are connected to rest on the floor of the cavity so that the floor or base of the cart cavity bears the weight of the goods stored in the bag while it remains in the cart.

The first and second walls of the cart will preferably have upper portions of a specified length and the first and second attachable bag holding accessories will be of respective lengths sufficient to extend along at least a majority of the specified lengths of the first and second walls. In a preferred form, the bag holding accessories will run almost the entire length of the first and second walls (or at least the portion defining the upper opening to the cavity within the cart) so as to maximize the number of bag securing mechanisms and associated tethers that can be coupled to each accessory. This helps ensure that a maximum number of bags can be held open within the cart and gives the consumer maximum flexibility with respect to how they want to use the accessories (e.g., such as how they want to use the accessories to hold their particular bags, etc.). As mentioned above, however, the apparatus may be provided in a variety of different shapes, sizes and configurations. For example, although a continuous or contiguous snap-fit groove connection has been discussed in many forms, it should be understood that in alternate forms a single point of connection may be used to connect the apparatus to the cart (e.g., such as one bolt type connection or one cam lock connection) instead of a connection running the length of the apparatus or a majority of the length of the apparatus.

While the above embodiments have focused on accessories attachable to conventional carts, it should also be understood that in alternate forms of the invention entire carts with bag holding accessories are disclosed herein and intended to be covered (e.g., carts with integrated bag holders similar to those discussed above). For example, in one form a cart is disclosed herein having a cart body with at least two side walls defining a cavity within which articles may be placed and having a plurality of wheels coupled to the cart body to mobilize the cart body. First and second receptacle securing mechanisms are coupled to the cart body via tethers and extendible between retracted positions wherein the securing mechanisms are positioned proximate respective portions of the cart and extended positions wherein the securing mechanisms are spaced apart from the respective portions of the cart and extended toward one another into the cavity defined by the cart body in order to assist in holding open at least one receptacle, such as a bag, when connected thereto.

In one form, the first and second receptacle securing mechanisms each comprise a plurality of receptacle securing mechanisms, with the cart further defining a plurality of recesses for receiving respective receptacle securing mechanisms when in the retracted position. As mentioned above, in one exemplary embodiment the receptacle securing mechanisms may be hooks or clasps and the plurality of recesses may be sockets corresponding in shape to the hooks or clasps so that when the hooks or clasps are moved to the retracted position the hooks or clasps are secured within the sockets to hinder inadvertent removal of the hooks or clasps from the sockets or hinder these items from snagging items placed into the cavity of the cart. The tethers will preferably each have a respective hook or clasp from the plurality of receptacle securing mechanisms, with the tethers being of elastic or expandable material that is resilient in nature and normally biasing the hooks or clasps in the retracted position due to the resilient nature of the elastic or expandable material.

The cart may be a basket-type shopping cart with at least one handle for pushing the cart and having a bottom wall with first, second, third and fourth side walls extending therefrom to form a generally rectangular cavity within which articles may be placed. The first and second receptacle securing mechanisms may be positioned on an upper portion of opposing side walls, with the tethers being of sufficient elastic or expandable material to allow the hooks or clasps to extend into the cavity to assist in holding open the at least one receptacle and to allow the at least one receptacle to rest on the bottom wall of the cavity once articles are disposed in the at least one receptacle. Although prior embodiments illustrate the bag holding accessories positioned on the top surface of side walls, it should be understood that in alternate forms (particularly those comprising a cart with integral bag holding features such as those described herein), the receptacle securing mechanisms and tethers do not need to extend from the very top surface of the cart, but may alternatively be positioned further down from the top surface within an upper portion of the side walls in order to help keep the receptacle securing mechanisms and tethers from interfering with consumer use of the cart or inadvertent snagging of items placed within the cavity of the cart.

In addition to the above-mentioned embodiments (e.g., apparatus or articles of manufacture), it should be understood that the invention disclosed herein includes various methods as well. For example, a method of retaining at least one receptacle in a cart in an open state is disclosed herein comprising the steps of providing a cart in accordance with the above description, moving the first and second receptacle securing mechanisms from retracted positions wherein the securing mechanisms are positioned proximate respective portions of the cart to extended positions wherein the securing mechanisms are spaced apart from the respective portions of the cart and extended toward one another in the cavity defined by the cart body, and securing the first and second receptacle securing mechanisms to the at least one receptacle in the cart to hold the at least one receptacle in an open state so that articles may be place directly into the at least one receptacle. Further methods may include ensuring that each receptacle securing mechanism comprises a plurality of hooks or clasps, with the cart further defining a plurality of recesses for receiving respective hooks or clasps of the receptacle securing mechanisms when in the retracted position, and the step of moving the receptacle securing mechanisms comprises moving the hooks or clasps between a retracted position wherein the hooks or clasps are positioned within respective recesses of the cart and an extended position wherein the hooks or clasps are spaced apart from the respective recesses. In yet other methods, the plurality of recesses may be sockets corresponding in shape to the hooks or clasps, and the tether comprises a plurality of tethers each having a respective hook or clasp from the plurality of receptacle securing mechanisms with the tethers being made of elastic or expandable material that is resilient in nature, and the step of moving the hooks and clasps comprises moving the hooks or clasps from a normally biased retracted position due to the resilient nature of the elastic or expandable material wherein the hooks or clasps are secured within the sockets to hinder inadvertent removal of the hooks or clasps from the sockets and the extended position wherein the hooks and clasps are spaced apart from the respective sockets.

In other examples, a method of manufacturing a receptacle securing mechanism is also provided. For example, such a method is disclosed having the steps of providing a base and coupling a receptacle securing mechanism to the base via a tether, and moving the receptacle securing mechanism between a retracted position located proximate the base and an extended position wherein the securing mechanism is spaced apart from the base.

In still other examples, a method of centering receptacles, such as bags, within a vehicle, such as a cart is also provided herein. By providing the bag securing mechanisms disclosed herein and ensuring the tethers connected to same are of equal length, the method further centers the receptacles within the cart. Other similar methods are also disclosed herein, such as methods for holding bags open within a vehicle, cavity, compartment or space, methods for securing bags to a cart in an open and usable manner, and methods for coupling a plurality of bags within a cart in an open and usable or operable manner and/or while allowing the bags to rest on a floor member while in the cart.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept. It should also be understood that terms used herein could have multiple meanings and typically all meanings are intended to be covered by same. For example, use of the terms "couple" or "coupled to" are intended to cover both direct connections between the items described and indirect connections between the items described.

What is claimed is:
1. A cart comprising:
 a cart body having at least two side walls defining a cavity for receiving articles and having a plurality of wheels coupled to the cart body to mobilize the cart body; and
 first and second receptacle securing mechanisms coupled to the cart body via tethers and extendible between retracted positions wherein the securing mechanisms are positioned proximate respective portions of the cart and extended positions wherein the securing mechanisms are spaced apart from the respective portions of the cart and extended toward one another into the cavity defined by the cart body in order to assist in holding open at least one receptacle when connected thereto.

2. The cart of claim 1 wherein the first and second receptacle securing mechanisms each comprise a plurality of receptacle securing mechanisms, with the cart further defining a plurality of recesses for receiving respective receptacle securing mechanisms when in the retracted position.

3. A method of retaining at least one receptacle in a cart in an open state comprising:
providing a cart in accordance with claim 1;
moving the first and second receptacle securing mechanisms from retracted positions wherein the securing mechanisms are positioned proximate respective portions of the cart to extended positions wherein the securing mechanisms are spaced apart from the respective portions of the cart and extended toward one another in the cavity defined by the cart body; and
securing the first and second receptacle securing mechanisms to the at least one receptacle in the cart to hold the at least one receptacle in an open state for receiving articles.

4. The method of claim 3 wherein each receptacle securing mechanism comprises a plurality of hooks or clasps, with the cart further defining a plurality of recesses for receiving respective hooks or clasps of the receptacle securing mechanisms when in the retracted position, and moving the receptacle securing mechanisms comprises moving the hooks or clasps between a retracted position wherein the hooks or clasps are positioned within respective recesses of the cart and an extended position wherein the hooks or clasps are spaced apart from the respective recesses.

5. The method of claim 4 wherein the plurality of recesses are sockets corresponding in shape to the hooks or clasps, and the tether comprises a plurality of tethers each having a respective hook or clasp from the plurality of receptacle securing mechanisms, the tethers being made of elastic or expandable material that is resilient in nature, and moving the hooks and clasps comprises moving the hooks or clasps from a normally biased retracted position due to the resilient nature of the elastic or expandable material wherein the hooks or clasps are secured within the sockets to hinder inadvertent removal of the hooks or clasps from the sockets and the extended position wherein the hooks and clasps are spaced apart from the respective sockets.

* * * * *